US005695107A

United States Patent [19]

Shoemaker, Jr.

[11] Patent Number: 5,695,107

[45] Date of Patent: Dec. 9, 1997

[54] TICKET DISPENSER WITH TICKET GUIDE AND DRAG MECHANISM FOR USE WITH THIN TICKETS

[76] Inventor: Stephen P. Shoemaker, Jr., 140 The Village #401, Redondo Beach, Calif. 90277

[21] Appl. No.: 522,431

[22] Filed: Aug. 31, 1995

[51] Int. Cl.$^6$ .......... B65H 23/18; B65H 23/08; B23Q 15/00

[52] U.S. Cl. .......... 226/39; 226/43; 226/195

[58] Field of Search .......... 226/38, 39, 43, 226/45, 181, 195

[56] References Cited

U.S. PATENT DOCUMENTS

| | | | |
|---|---|---|---|
| 2,050,602 | 8/1936 | Foehrenbach et al. | 164/99 |
| 2,155,414 | 4/1939 | Eitzen | 226/43 |
| 2,173,831 | 9/1939 | Eitzen | 226/43 |
| 2,208,946 | 7/1940 | Newman | 226/43 |
| 2,219,650 | 10/1940 | Helsel | 164/42 |
| 2,272,859 | 2/1942 | Wilsey | 312/88 |
| 2,359,182 | 9/1944 | Wilsey | 312/97.1 |
| 2,657,601 | 11/1953 | Bentley | 81/9.51 |
| 2,657,750 | 11/1953 | Webb | 164/84.5 |
| 2,748,861 | 6/1956 | Stoeser | 164/49 |
| 2,946,281 | 7/1960 | Sohn | 101/227 |
| 3,280,678 | 10/1966 | Shackelford | 83/35 |
| 3,627,183 | 12/1971 | Mason | 225/96.5 |
| 3,653,540 | 4/1972 | Offutt | 221/75 |
| 3,699,834 | 10/1972 | Bracken | 83/446 |
| 3,734,261 | 5/1973 | Richer | 194/4 F |
| 3,750,512 | 8/1973 | Gotham et al. | 83/356.3 |
| 3,768,101 | 10/1973 | Kuts | 83/408 |
| 3,803,059 | 4/1974 | Rung | 83/18 |
| 3,855,890 | 12/1974 | Lynch et al. | 83/331 |
| 3,904,145 | 9/1975 | Steinberger et al. | 226/39 |
| 4,018,359 | 4/1977 | Lambert | 221/14 |
| 4,071,178 | 1/1978 | Copp | 226/39 |
| 4,179,055 | 12/1979 | Milner | 225/80 |
| 4,272,001 | 6/1981 | Horniak | 226/187 |
| 4,554,850 | 11/1985 | Edgar et al. | 83/178 |
| 4,560,088 | 12/1985 | Tan | 221/75 |
| 4,719,832 | 1/1988 | Svihra | 83/407 |

OTHER PUBLICATIONS

"Ticket Dispenser," Deltronic Labs inc., Chalfont, PA, pp. 1–2.

*Primary Examiner*—Daniel P. Stodola
*Assistant Examiner*—Matthew A. Kaness
*Attorney, Agent, or Firm*—Hickman Beyer & Weaver

[57] ABSTRACT

A redemption ticket and dispenser therefor. The redemption tickets or "stamps" are printed with indicia that include a sequence of successive characters printed across multiple tickets. The tickets may have about a thickness of white bond paper (20 lb.) and a length as little as three-quarters of an inch. A notch is cut at a perforation between each of the tickets of the strip, and the ticket strip can be gummed to allow the tickets to adhere to a surface. A ticket dispenser for dispensing the improved (or other) redemption tickets receives a ticket strip from a ticket supply and includes a rear guide, sensor, front guide, and drive roller along a ticket path. The drive roller engages and pulls the tickets strip along the ticket path, while the rear and front guides align the ticket strip. The ticket strip is wrapped at least partially around the guides and drive roller so that drag is induced on the ticket strip to prevent a recipient of the tickets from pulling the tickets out of the dispenser. The strip of tickets is dispensed from an arcade game through an outlet positioned at the front of the ticket dispenser.

30 Claims, 10 Drawing Sheets

Fig. 7
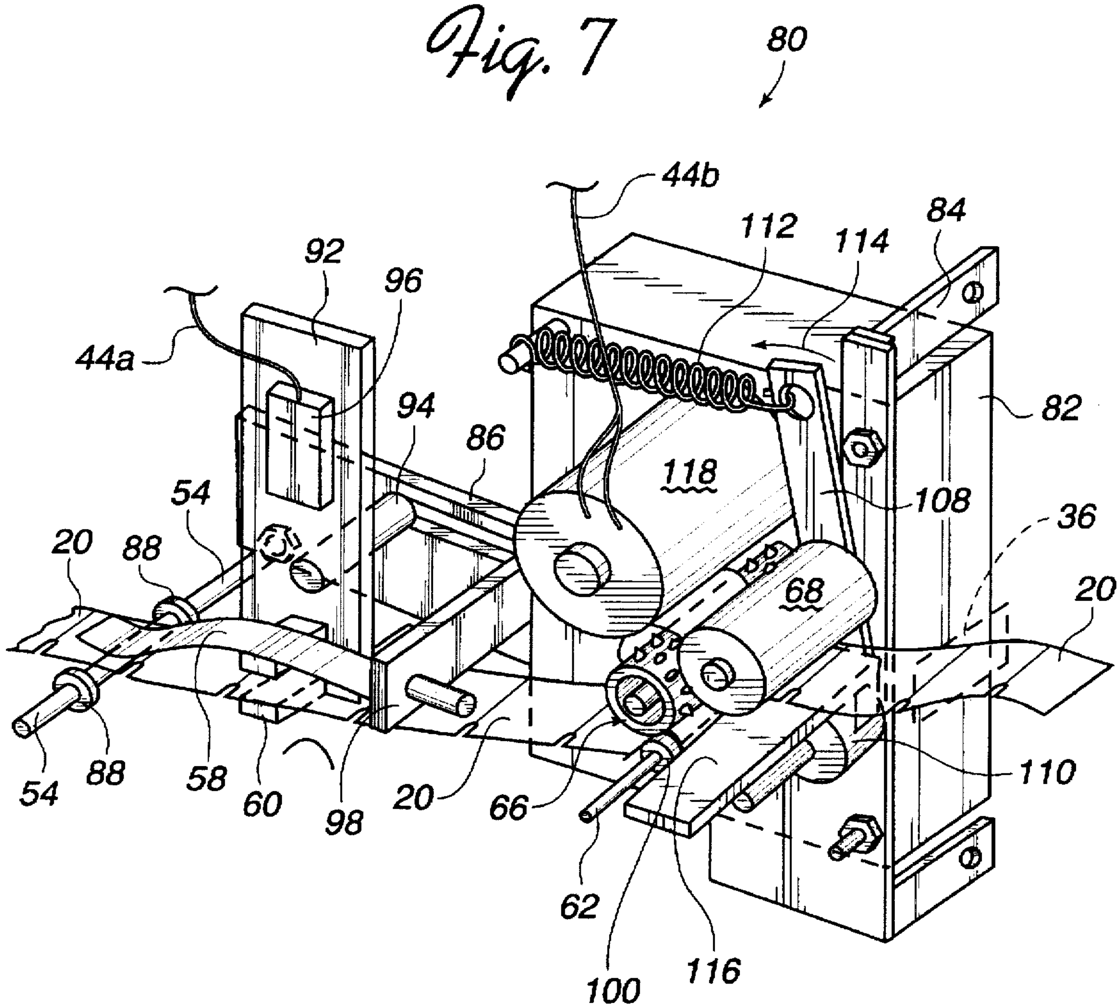
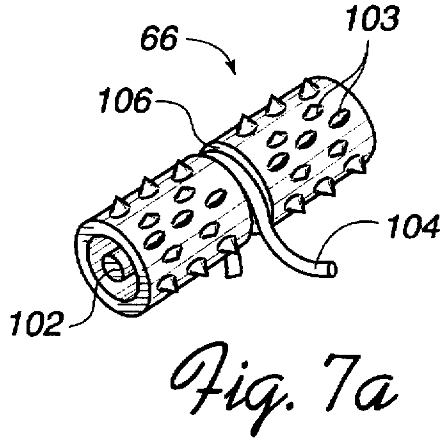
Fig. 7a

TICKET DISPENSER WITH TICKET GUIDE AND DRAG MECHANISM FOR USE WITH THIN TICKETS

BACKGROUND OF THE INVENTION

1. Field of the Invention

This invention relates to redemption tickets and ticket dispensers, and more particularly to redemption tickets and dispensers used in redemption-type arcade games.

2. Background of the Related Art

Tickets dispensers are used wherever tickets can be used as a means for exchange of goods and/or services. For example, amusement parks, theaters, and other public entertainment can use tickets to ensure that customers have paid an admission fee before making use of the entertainment services. In other fields such as public transportation, tickets can provide a similar service.

Another popular field for using tickets and ticket dispensers is the field of arcade games. Players of the arcade games can win redemption tickets based on a final score or goals which were completed during a game. The redemption tickets can be redeemed for prizes offered at the arcade.

In a typical redemption-type arcade game, a ticket dispenser is positioned at a front panel or front area of a game unit, where players have easy access to dispensed tickets. Generally, a supply such as a roll or fan fold of tickets is stored in a cache or compartment near the ticket dispenser within a game unit. The operator of the game can replace tickets when the supply is exhausted. The tickets are routed from the supply, through the dispensing mechanism, and to a front slot in the game unit through which the tickets are dispensed. The dispensing mechanism may include one or more motor-driven rollers which move the strip of tickets out of the slot.

Examples of prior art ticket dispensers can be found in U.S. Pat. Nos. 3,627,183, of V. Mason, U.S. Pat. No. 2,657,750 of C. F. Webb, U.S. Pat. No. 2,219,650 of R. H. Helsel, and U.S. Pat. No. 3,280,678 of W. T. Shackelford.

A ticket dispenser typically used in arcade games is manufactured by Deltronic Labs, Inc. (U.S. Pat. No. 4,272, 001). In the Deltronic dispenser, a ticket strip is routed from a supply to the back of the dispenser, through a sensor, through a set of pinch rollers, and out a dispensing slot in the game unit. The pinch rollers push the tickets along the ticket path and out the dispensing slot. The pinch rollers are on a wedge slide, such that when a ticket is attempted to pulled out the slot by a game player, the pinch rollers grab the ticket more tightly in proportion to the pulling force to prevent any tickets from being pulled.

A problem with prior art redemption tickets is that the tickets are made of heavy paper stock and are thus somewhat thick. This is not a problem in non-game uses of the tickets, since tickets needed to be durable for handling purposes. In addition, for non-game uses, the ticket should a large enough size so that numbers and a manufacturer name could be printed on each ticket. These tickets can then be used in random drawings and the like, and the manufacturer could keep track of the numbers of tickets dispensed.

The same thick, larger-sized tickets were naturally brought over to redemption-type arcade games. However, this type of ticket has become inadequate for redemption-type game uses. This is because only a certain amount of tickets may be stored at one time in the ticket supply space in the game unit, and the amount of tickets stored depends on the width and size of each ticket. With thicker tickets, less tickets can be stored for the dispenser in a given amount of space. This does not pose much of a problem when only 1–20 or so tickets are dispensed per game. However, more recently, additional features have been added to redemption arcade games, such as progressive bonus features. In addition, prizes of greater worth are often offered to customers, and it is easier to count large numbers tickets using accurate scales instead of manually counting the tickets. All of these factors have recently contributed to very large numbers of tickets being dispensed to players in a single game and over many games played on a redemption arcade game unit. For example, it is common for an arcade game unit including a progressive feature to accumulate a ticket award of 1000 or more tickets and to dispense those tickets. Using the ticket size of the prior art, an operator must continuously refill the ticket supply cache as tickets run out, incurring additional labor expense. In addition, the cost of the operator to purchase large numbers of tickets can get exceedingly high.

In addition, the prior art ticket dispensers do not lend themselves to dispensing thinner or less stiff tickets. This is due to the prior art dispensers utilizing the thickness of the tickets to push the tickets through the dispensing slot. A high amount of tension is required to grip the tickets and push them out of the slot. This type of mechanism is not suitable for use with thinner tickets since tension would cause the thinner tickets to tear, crumple or otherwise become mutilated in the dispenser, leading to excessive ticket jams and misfeeds.

SUMMARY OF INVENTION

The present invention provides an improved redemption ticket and dispenser therefor. The redemption ticket or redemption "stamp" is smaller, thinner, and lighter than previous redemption tickets, which allows the tickets to be produced more inexpensively and also allows a greater number of tickets to be stored before having to refill a ticket supply. The ticket dispenser of the present invention is suited to dispense the improved tickets.

A method for producing redemption tickets of the present invention for use in a ticket dispenser includes steps of receiving a continuous strip of paper, printing indicia on the strip of paper, and cutting the strip of paper to produce a continuous strip of tickets that is to be dispensed from a ticket dispenser. The tickets are preferably dispensed from a ticket dispenser in a redemption-type arcade game. The strip of paper is preferably cut into pairs of the strips of tickets during the cutting step, and each ticket in the strips is separated from an adjacent ticket by a perforation. Each of the tickets includes a notch or hole and has about the thickness of standard white bond paper, i.e., a weight at most of about 20 lbs. Preferably, each of the tickets is not more than about three-quarters of an inch in length.

In addition, a center strip between the two strips of tickets is cut out and discarded after the cutting step. The notch on the tickets is preferably cut at the perforation for each of the tickets, and the paper cut out of each notch is included in the discarded center strip. The printed indicia on the ticket strips can include a vendor name and information is printed across multiple tickets so that each ticket has been printed with at least some of the indicia. Preferably, the indicia includes a sequence of successive characters printed across multiple tickets. In addition, the strip of paper can be gummed on one or two sides so that a fluid can be applied to the gummed side of a ticket to cause the ticket to adhere to a surface.

A ticket dispenser for dispensing the improved redemption tickets of the present invention includes a rear guide positioned near the rear of the ticket dispenser for engaging a continuous strip of tickets. The rear guide guides the strip of tickets along a ticket path from a supply of tickets and provides an amount of drag to the movement of the ticket strip along the ticket path. The drag prevents a recipient of the tickets from pulling the tickets out of the dispenser and keeps the tickets in a straight line within the dispenser. A driver engages the ticket strip and pulls the strip along the ticket path from the supply of tickets towards the front of the ticket dispenser. The strip of tickets is dispensed from an arcade game through an outlet positioned at the front of the ticket dispenser.

The strip of tickets preferably includes the improved ticket of the present invention, and thus is made of about 20 lb. stock or less, a width less than about ¾ inch, and each ticket of the strip has a length less than about ¾ inch. The rear guide includes a tension spring for providing the drag to the movement of the strip of tickets. A sensor is preferably positioned on the ticket path for detecting the number of notches, and thus tickets, that have been dispensed from the outlet. The driver includes a knurled drive roller for engaging and pulling the strip of tickets. The strip of tickets wraps around at least one-half of the circumference of the drive roller to provide additional drag to the strip of tickets when said strip is pulled from said outlet by a recipient. A guide wire is positioned at least partially about the circumference of the driver roller for preventing the strip of tickets from sticking to the drive roller.

A cylindrical front guide is also preferably positioned before the drive roller on the ticket path. The front guide aligns the strip of tickets for the drive roller. The strip of tickets is preferably wrapped around at least one-quarter of the circumference of the front guide to provide additional drag to the movement of the strip of tickets along the ticket path. A pinch roller holds the strip of tickets against the drive roller and is coupled to a spring member for forcing the pinch roller against the drive roller. One side of the ticket dispenser is preferably open to allow the strip of tickets to be viewed and accessed at all points along the ticket path by an operator. A controller is coupled to the drive roller for activating the drive roller to dispense a desired number of tickets from the outlet. The controller is also coupled to the sensor for sensing the dispensed amount of tickets.

The improved redemption ticket of the present invention allows more tickets to be stored in a supply space for the same or less cost than prior art tickets. The ticket dispenser of the present invention allows the improved tickets or other types of tickets to be dispensed to a player of an arcade game or other recipient. The ticket dispenser pulls the ticket strip from the front of the dispenser rather than pushing the tickets from the rear. Also, the ticket strip is wrapped around several guides and rollers to provide drag and prevent the recipient of the tickets from pulling out the tickets. The ticket dispenser is open ended to allow an operator to freely and quickly access and repair components of the dispenser.

These and other advantages of the present invention will become apparent to those skilled in the art after reading the following descriptions and studying the various figures of the drawings.

BRIEF DESCRIPTION OF THE DRAWINGS

FIG. 7 is a perspective view of an embodiment of the ticket dispenser of FIG. 6;

FIG. 7*a* is a perspective detail view of the drive roller of the ticket dispenser of FIG. 7;

DETAILED DESCRIPTION OF THE PREFERRED EMBODIMENTS

The improved ticket and ticket dispenser of the present invention can be used for a variety of applications that require tickets to be used for exchange of goods and/or services. For example, the tickets and dispenser can be used for entertainment purposes, as in movie theaters, amusement parks, and the like; transportation services, such as a train, bus, etc.; and so on. The present invention, however, is particularly well-suited to games, specifically arcade redemption-type games that provide tickets as a non-monetary award to players of the games. It is with this application in mind that the embodiment of the present invention is described.

Figure 1:
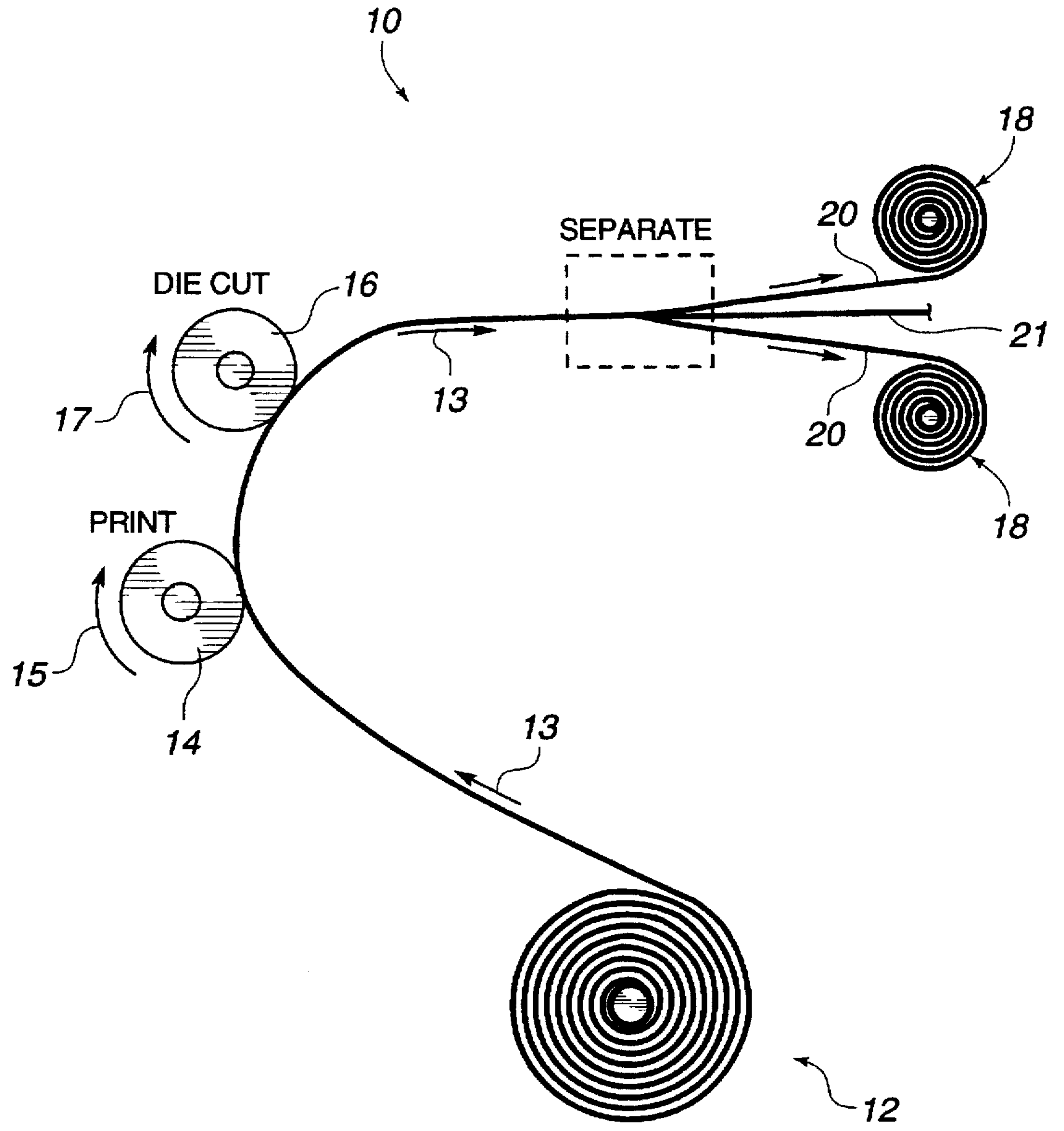
FIG. 1 is a schematic diagram of an apparatus and method for making an improved ticket of the present invention.

FIG. 1 is a schematic diagram illustrating a suitable apparatus 10 and method for making redemption tickets in accordance with the present invention. The tickets of the present inventions are also referred to herein as "stamps" or "redemption stamps", since the tickets are thin and are shaped much like standard postage stamps.

A supply 11 of a continuous paper strip 12 is provided. The supply can be a roll of paper strip 12 or other form of storing the paper strip. The paper strip is preferably slightly more than a multiple of double the width of the desired ticket strip (described subsequently), since a multiple of two ticket strips are to be cut from the paper strip in the described method (2, 4, 6, etc. ticket strips). The paper strip is fed in the direction of arrow 13 using a feeding apparatus (not shown) well known to those skilled in the art. The tickets are routed to a printing apparatus 14, which is a printing press or similar device that is well known to those skilled in the art for printing indicia on paper and other materials. For example, a Mark Andy Web Press available from Andy Small can be used. Printing apparatus 14 preferably prints indicia on paper strip 12 as the paper strip is moved past the printing apparatus. For example, a printing drum of printing apparatus 14 can rotate in the direction of arrow 15 as the paper strip moves through the printing apparatus:

The paper strip 12 is next moved to die cut apparatus 16, which is used to cut out the tickets from the paper strip. Many types of die cut apparatuses can be used for the present invention, as are well known to those skilled in the art. For example, a steel rule die cut machine can be used. Preferably, two strips of tickets are cut from the paper strip. A drum can rotate in a direction indicated by arrow 17 to cut the paper strip, as is well known to those skilled in the art. The die cut mechanism 16 cuts perforations between individual tickets so that individual tickets can be torn or easily removed from adjacent attached tickets. A perforation can be one or more cuts across the width of the ticket strip at the division of each ticket, while leaving gaps where the paper strip is not cut so as to keep each ticket attached to adjacent tickets and provide sufficient strength so that the tickets will not be separated when moving through a dispenser. The tickets strips cut from paper strip 12 and the perforations of the ticket strip are shown in FIG. 2.

After passing through the die cut apparatus 16, the cut paper strip is separated into two ticket strips 20, where each ticket strip 20 is rolled onto a supply roll 18 while a center strip between the two strips 20 is discarded. This is illustrated in greater detail with respect to FIG. 2. The resulting ticket strips 20 can be stored on a roll or in a fan-fold configuration as is well-known to those skilled in the art.

Figure 2:
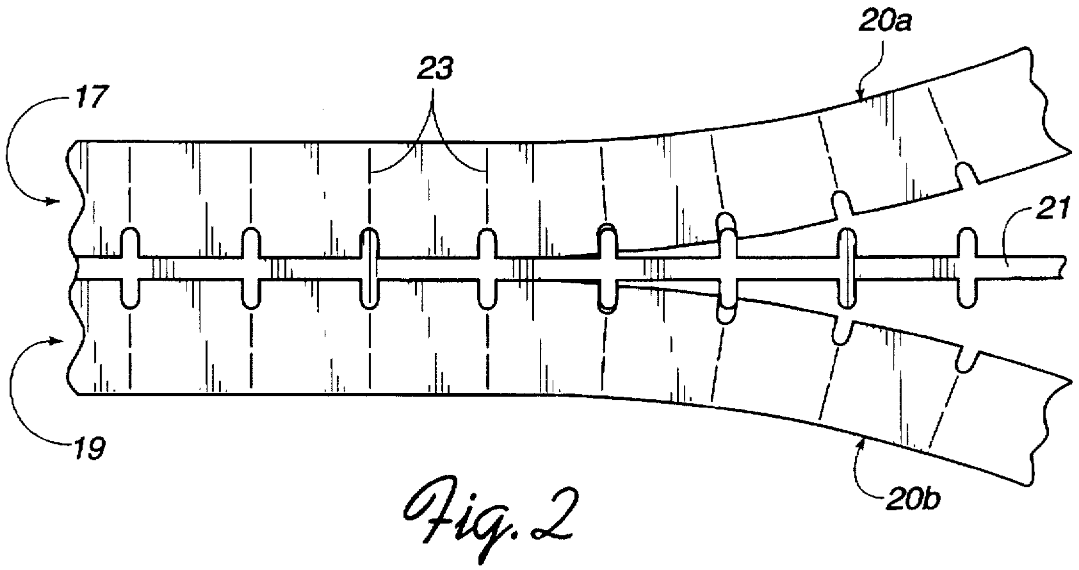
FIG. 2 is a detailed view of the process of separating ticket strips after a cutting process.

FIG. 2 is a detailed view of ticket strips 20 of the present invention being separated after being cut by die cut apparatus 16 in the apparatus of FIG. 1. Ticket strip **20*a* is cut on one end 17 of paper strip 12, and ticket strip 20*b* is cut on the opposite end 19 of paper strip 12. The two ticket strips are routed away from the center of the paper strip, leaving center strip 21 which preferably includes all the paper material that was cut from notches 22 in ticket strips 20*a* and 20*b* and the center paper portion between the two ticket strips. The center strip 21 is discarded while each ticket strip 20*a* and 20*b* is collected and stored as on roll 18 or in a fan-fold or another arrangement. The ticket strips 20*a* and 20*b* are then ready to be provided in the ticket supply of a ticket dispenser, such as the ticket dispenser of the present invention, described with reference to FIGS. 4 and 6**.

Figure 3:
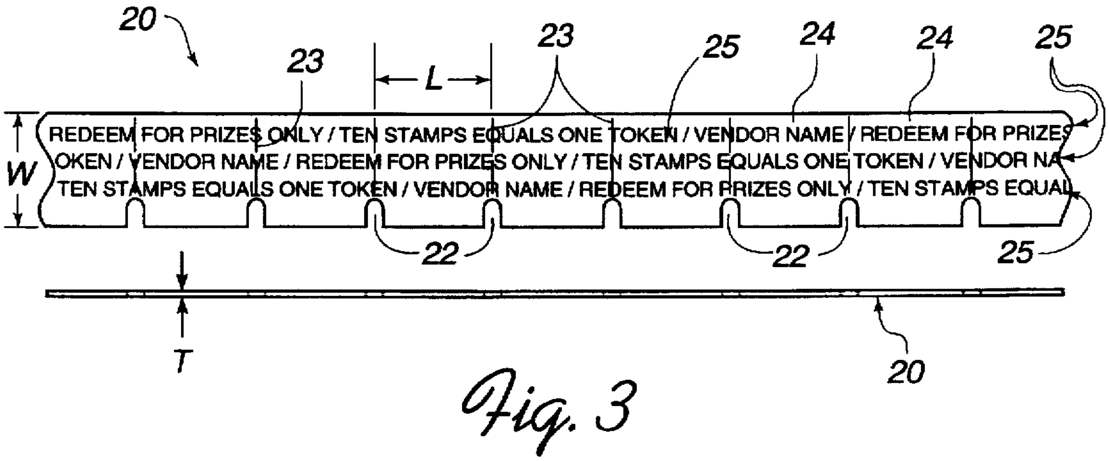
FIG. 3 is a detailed view of the improved ticket of the present invention.

FIG. 3 is a detailed view of a finished ticket strip 20 of the present invention. Ticket strip 20 includes notches 22 to provide a ticket dispenser with means for counting the number of tickets that are dispensed. The use of notches in a ticket dispenser is described in greater detail with reference to FIG. 9. Alternatively, holes in tickets 24 or notches in different locations of tickets 24 can be provided. Perforations 23 are cuts in the paper of ticket strip 20 (more clearly seen in FIG. 12) which divide ticket strip 20 into individual tickets 24. A player or other receiver of the tickets can tear dispensed tickets 24 at a perforation from remaining undispensed tickets attached to ticket strip 20.

The surface area of each individual ticket 24 of the present invention is relatively small compared to other redemption tickets of the prior art. A ticket 24 of the described embodiment has a length L of about ¾ inch and a width W of about ¾ inch. Preferably, the tickets 24 can have a length L in the range of about ½ inch to ¾ inch and a width W is the range of ½ to ¾ inches. This contrasts to the general size of a prior art ticket having a length of about 1 and ½ inches and a width of about 1 inch. A ticket 24 with a smaller area allows a greater number of tickets to be stored in a supply storage space for a dispenser. The smaller size also allows tickets receivers such as redemption game players to store and carry a greater number of tickets more conveniently.

In addition, the ticket strip 20 of the present invention has a thickness T which is about the same as white bond paper (20 lb. bond paper stock). This contrasts with the prior art tickets which typically have a much greater thickness equivalent to the weight of cardstock or book cover (about 80–100 lb. paper stock) or more. A thinner ticket allows a much greater number of tickets to be stored in a supply storage space, since redemption tickets are generally stored on a roll or fan-fold where the tickets are layered on top of one another in rows or around a circular spool. The small thickness of the tickets of the present invention therefore plays a major role in allowing more tickets to be stored on a spool or in a particular storage space, thus saving significant time for the provider of the tickets, who does not have to refill the ticket supply for a dispenser as often. In addition, since the tickets 24 of the present invention ("thin tickets") are smaller, a larger number of these thin tickets can be purchased for the same price of a smaller number of prior art tickets, thus saving significant expense for the ticket purchaser who wishes to supply a dispenser. The thin tickets are also more lightweight, which can be convenient for a user or player. The thin tickets can be weighed on a sensitive scale by a prize distributor to determine how many tickets are being redeemed for a prize, as is well known to those skilled in the art; or the tickets can be counted manually by the prize distributor.

Figure 11:
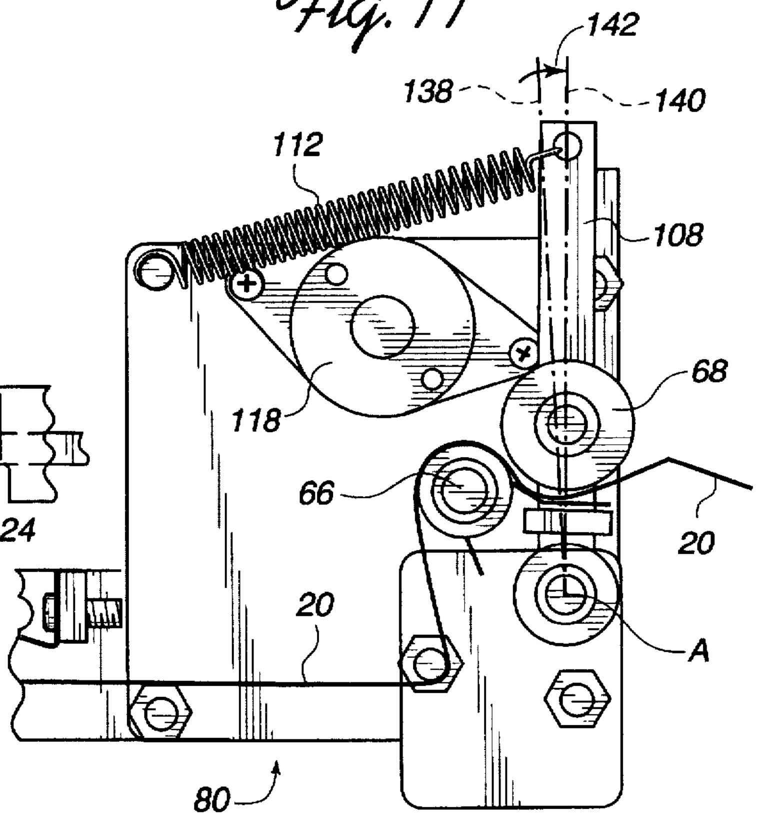
FIG. 11 is a detail view of the ticket dispenser as shown in FIG. 8 with a pinch roller moved to an open position.

Printed indicia 25 are also provided on one or both sides of ticket strip 20. Indicia 25 can specify information that the ticket manufacturer or vendor wishes to advertise or portray to game players or other receivers of the tickets. Such information can include the ticket vendor name, arcade game vendor name, exchange rate of the tickets, disclaimers or statements of ticket use, etc. The printed indicia can appear in one or more rows; for example, three rows of indicia are shown in FIG. 3. The printed indicia 25 are preferably printed across several individual tickets 24 so that a part of a word or number may appear on one ticket 24, while the remaining part of the word or number may appear on one or more adjacent tickets 24. This allows the printing apparatus 10 as shown in FIG. 11 to print larger indicia across multiple tickets. Significant reduction of cost in printing tickets can be achieved with this method, especially compared to tickets of the prior art. In the prior art, indicia such as numbers and manufacturer name are typically printed on each individual ticket of a ticket strip. However, in general, the smaller the area to be printed, the more costly the printing process. Since the tickets 24 of the present invention are smaller than prior art tickets, printing on each individual ticket 24 would be more costly. In addition, since a large number of tickets is generally produced in the ticket redemption industry, printing on large numbers of individual tickets can become very expensive for any size ticket. The method of printing across multiple redemption tickets 24 of the present invention thus provides a simple and efficient process to reduce the cost of printing tickets in the manufacturing process.

In one embodiment of the present invention, tickets 24 of ticket strip 20 can also be gummed. For example, paper strip 12 can be purchased from a vendor as "dry gum" paper in various colors and having one or both sides pre-gummed, as is well known to those skilled in the art. One side of ticket strip 20 can be coated with a material, for example, that becomes adhesive when a fluid is applied to the material, as in typical postage stamps or envelopes. Other types of adhesive materials can also be used. The gummed tickets 24 can be collected by players or other receivers of the tickets and can be adhered to pages in a book or other collection, for example, to conveniently organize the tickets. Since very large numbers of tickets (sometimes 500 or more) can be dispensed to players of redemption games, such organization in books can be helpful to both the player and the prize distributor. Tickets organized in a book would be easier for the prize distributor to count to determine how many tickets are being redeemed for a prize.

Figure 4:
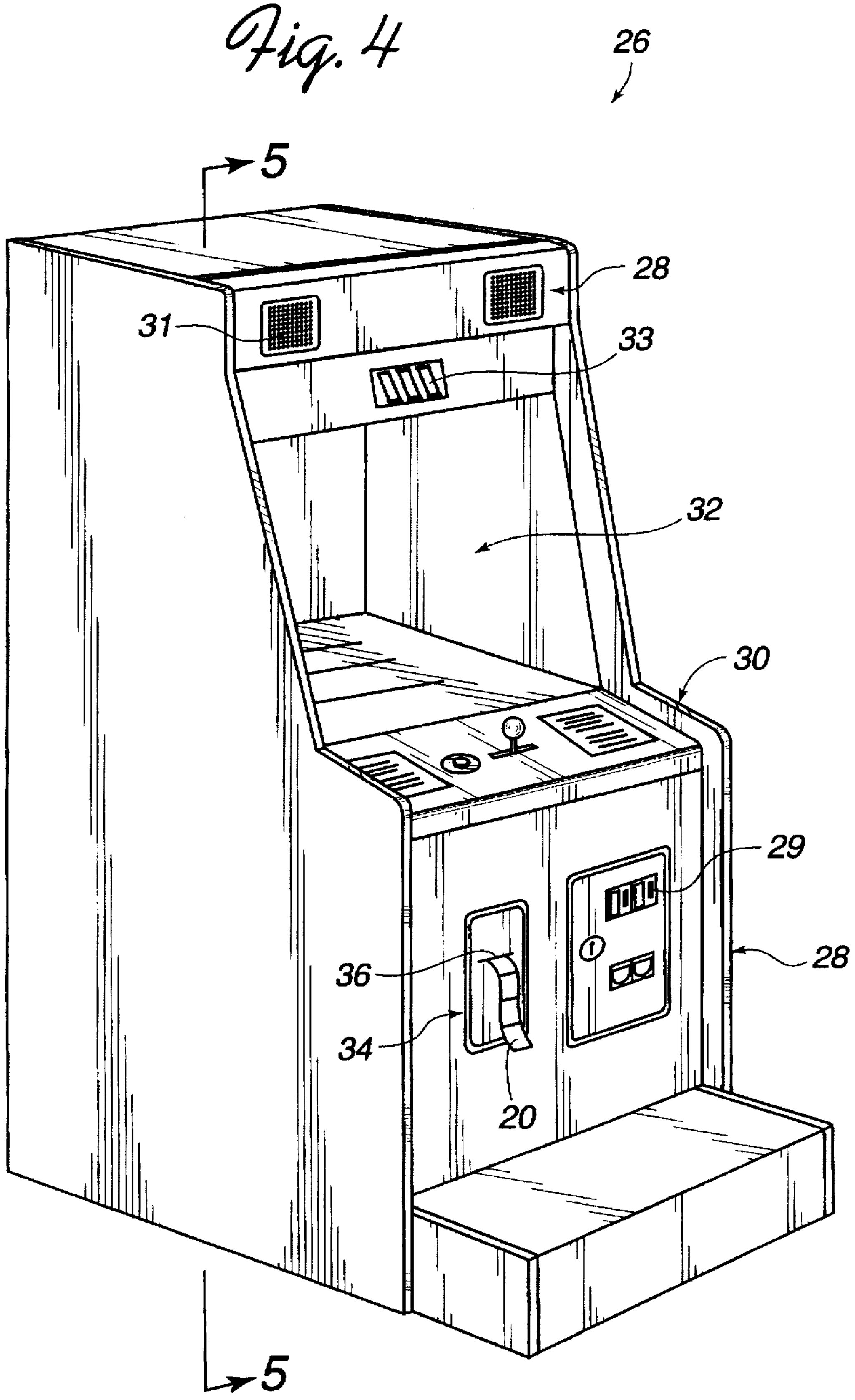
FIG. 4 is a perspective view of a redemption-type game apparatus suitable for use with the ticket dispenser of the present invention.

FIG. 4 is a perspective view of an example of a generic arcade redemption-type game apparatus 26 suitable for use with the ticket dispenser and ticket of the present invention. Such game apparatuses are well-known to those skilled in the art and can take a wide variety of forms; apparatus 26 is just one example. Game apparatus 26 typically includes a front panel section 28, player controls 30, and a playing area 32.

Front panel section 28 can be positioned below the player controls 30, as shown in FIG. 1. The front panel section can also be positioned in a wide variety of other locations, such as above playing area 32, to the side of the playing area or player controls, etc. Front panel section 28 includes a coin deposit slot 29, speakers 31, and a ticket dispenser 34.

Coin deposit slot 29 typically accepts standard currency coins, game tokens, or bills that are often available in an arcade environment. A coin deposited in coin deposit slot 29 starts a game. A playing piece may be released for the player to use during the game, player controls may be activated to allow a player to play the game, etc. Speakers 31 emits sounds based on game actions and other game states and is controlled by a game unit controller system, as is well known to those skilled in the art. Ticket dispenser 34 of the present invention dispenses a ticket award to the player based upon the results of a game, and is described in greater detail subsequently. The front panel 28 can also include other features, such as a playing piece dispenser, if appropriate.

Player controls 30 allow a player to manipulate events in the game, and typically include a joystick, buttons, a knob, or the like. Game action occurs in playing area 32, where, for example, a playing piece, video image, or other game object may be controlled and/or guided by the player on a field, video screen, etc. to achieve a goal. Once the goal is achieved, a game score is typically increased. The game score can be displayed on a display 33. Some games also include a progressive bonus score, which is a score contributed to by multiple connected game units. Depending on the game, a player may get multiple chances to play with one coin, or the player may have to insert additional coins.

When a game is over, ticket dispenser 34 dispenses an amount of tickets 20 to the player through an outlet 36 in the ticket dispenser. Alternatively, the tickets can be dispensed during a game, if desired. These tickets are preferably in the form of ticket strip 20 as shown in FIG. 3. The number of dispensed tickets is based upon the results of the game, and is typically based on the final game score displayed on display 33. For example, one ticket can be dispensed for every 5 points of game score, 2 points of game score, 0.1 points of game score, or any amount the operator of the game apparatus desires. If a progressive feature is being implemented in game apparatus 26, the number of dispensed tickets can be based on the progressive score if a progressive task was completed by the player during the game.

The dispensed tickets 20 may preferably be accumulated by a player and redeemed to win various prizes. In general, the greater the worth of the prize desired, the more tickets are needed to be exchanged for that prize.

The ticket dispenser 34, game score display 33, player controls 30, and other functions of the game apparatus 26 are preferably controlled by a control system. This system is described in detail with respect to FIG. 13.

Figure 5:
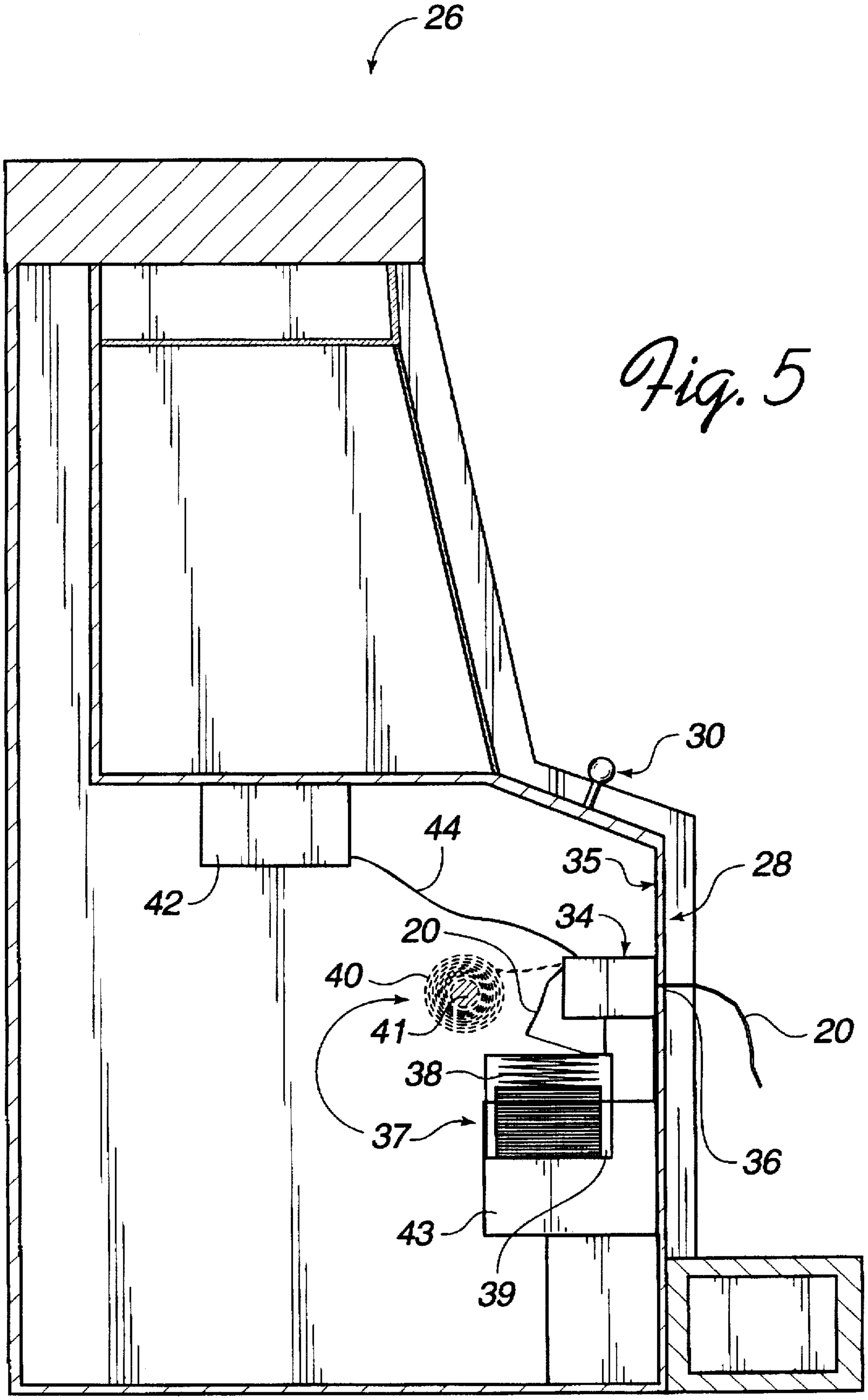
FIG. 5 is a side sectional view of the game apparatus taken along 5—5 of FIG. 4.

FIG. 5 is a side sectional view of game apparatus 26 along line 5—5 of FIG. 4 to show the interior of game apparatus 26. Interior components specific to the mechanics and implementation of game play are not shown and are well known to those skilled in the art. Ticket dispenser 34 is positioned behind front panel 28 and is preferably coupled to the back side 35 of front panel 28. Dispensed tickets 20 are routed through outlet 36, which is an aperture in front panel 12.

Ticket strip 20 originates from a supply 37 of tickets positioned in the interior of game apparatus 26. Supply 37 is preferably a fan-fold 38 of ticket strip 20 which is stored in a box 39 or similar container positioned below and/or to the rear of ticket dispenser 34. Ticket strip 20 in fan-fold 34 is folded in a criss-cross pattern after each X amount of tickets 24, where X is a number such as 10, 20, etc. Tickets 20 naturally unfold as they are fed through ticket dispenser 34.

Alternatively, supply 37 of ticket strip 20 can be provided as a roll 40. Roll 40 includes a rotating spindle 41 or a similar member around which tickets 20 are wrapped. As the tickets are fed through dispenser 34, roll 40 rotates to unravel additional tickets. Roll 40 can be positioned to the rear or below ticket dispenser 34 in a box similar to box 39, for example.

Ticket dispenser 34 is also coupled via a bus 44 to main control system 42, which controls the operation of ticket dispenser 34 and other components of the game apparatus 26. Control system 42 can be positioned in a wide variety of places within game apparatus 26, and is shown positioned under playing area 32 as an example. Control system 42 preferably includes a number of electronic components on a circuit board or similar substrate and is described in greater detail with respect to FIG. 13.

Also typically included in the interior of game apparatus 26 is a coin box 43. Coin box 43 can be positioned on the interior side of front panel 28 to allow store coins or other monetary input that have been inserted in coin deposit slot 29.

Figure 6:
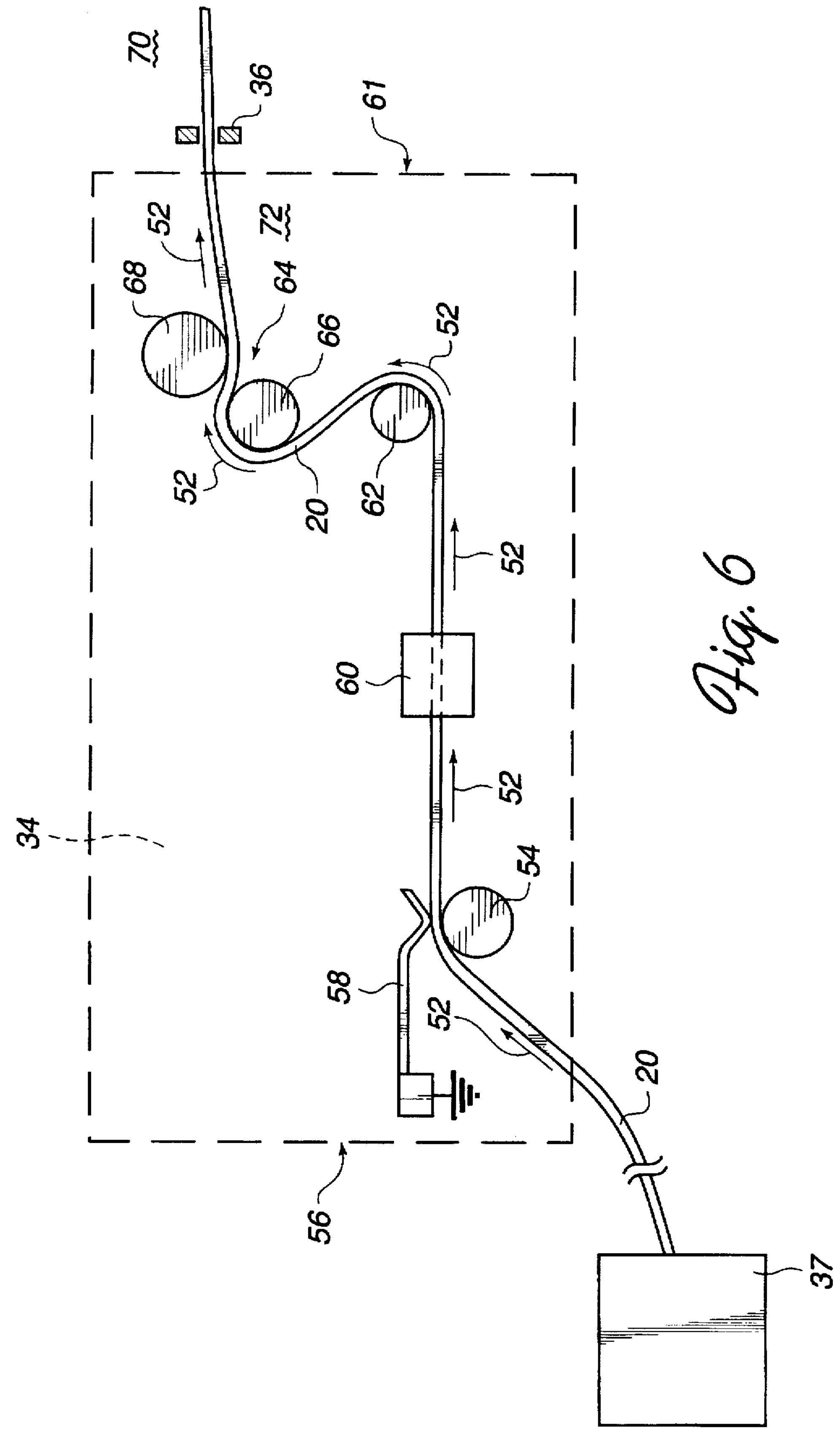
FIG. 6 is a schematic view of the ticket dispenser of the present invention.

FIG. 6 is a schematic view of ticket dispenser 34 of the present invention. A ticket strip 20 is moved along a ticket path, indicated by arrows 52. Ticket supply 37 provides ticket strip 20 as described with reference to FIG. 5. The ticket dispenser of the present invention is well suited to dispense the thinner, smaller tickets 24 as shown in FIG. 3. However, the ticket dispenser 34 can equally well dispense other types of tickets, such as the thicker tickets of the prior art. In addition, even thinner tickets than the tickets 24 described above can be dispensed from the ticket dispenser of the present invention.

The ticket strip 20 first is engaged by rear guide 54 which is positioned at a rear end 56 of ticket dispenser 34. Rear guide aligns the strip of tickets 20 for other components in ticket dispenser 34, as described below. In addition, a grounded tension spring 58 is biased against rear guide 54 to cause an amount of drag to the movement of ticket strip 20, which is routed between the tension spring 58 and rear guide 54. The purpose of this drag will be explained subsequently. In FIG. 6, tension spring 58 is shown as a leaf spring having a member biased against rear guide 54. In other embodiments, other types of tension springs can be used. In addition, the tension applied to ticket strip 20 by tension spring 58 may preferably be adjusted, either by replacing the spring or adjusting the tension of the existing spring. This adjustable tension allows ticket strip 20 to include tickets that are easy to tear from the strip, or tickets that are hard to tear, since the tension can be adjusted according to the type of tickets.

After rear guide 54, ticket strip 20 is routed along ticket path 52 to sensor 60, which is preferably positioned dose to rear guide 54. Sensor 60 detects each individual ticket of the strip of tickets 20. This can be accomplished using a wide variety of methods; the preferred method is described subsequently with reference to FIG. 7. The sensor detects each ticket as the strip of tickets 20 moves past the sensor and sends a signal informing the control system of each detected ticket 24. The main control system 42 can therefore keep track of the number of tickets 24 that have moved through the sensor and the ticket dispenser 34.

Ticket strip 20 is routed to front guide 62 after sensor 60. Front guide 62 is preferably positioned closer to front end 61 of ticket dispenser 34 than sensor 60. Front guide 62 aligns ticket strip 20 for drive mechanism 64. Also, ticket strip 20 is wrapped around a portion of front guide 62 to cause additional drag to the movement of ticket strip 20 along path 50; the reasons for this are explained subsequently. In the described embodiment, front guide 62 is a cylindrical member allowing ticket strip 20 to frictionally engage its curved surface for at least a quarter of the circumference of the front guide. A specific amount of surface tension or drag around the front guide is thus transmitted to the ticket strip 20.

After front guide 62, ticket strip 20 is routed through a drive mechanism 64. In the described embodiment, drive mechanism 64 includes a drive roller 66 around which ticket strip 20 is wrapped. Preferably, ticket strip 20 is wrapped around at least 50% of the circumference of drive roller 66. Drive roller 66 is driven by a motor or other active drive element and pulls the ticket strip along the ticket path 52 through the ticket dispenser. A pinch roller 68 can be used to force the ticket strip 20 against the drive roller 66 to allow the drive roller to grip the ticket strip.

The pulling force to cause ticket strip 20 to move along the ticket path 52 is important for the ticket dispenser of the present invention. The ticket dispenser 34 described herein is intended to be used with thinner, smaller, more lightweight tickets, such as the stamp-type tickets 24 of the present invention as described with reference to FIG. 3. These tickets 24 are too thin for a pushing mechanism to move the ticket strip 20 through the dispenser 34, since the tickets would fold on themselves, crumple, or become jammed. For example, the prior art dispensers push the tickets through outlet 36 using tension rollers located near the middle of the dispenser. The ticket dispenser of the present invention, however, pulls the tickets from a location near the front of the dispenser using drive roller 66, and is thus able to dispense thinner tickets. Pinch roller 68 provides a small amount of tension against drive roller 66; since the preferred tickets are thin compared to normal tickets, very little tension is required (or desired). This small amount of tension between rollers 66 and 68 also is advantageous in that ticket jams do not occur as often and are not as severe that if a large amount of tension were applied between the rollers. In addition, the life of mechanical parts, such as motors, can be extended using light amounts of tension. The ticket dispenser of the present invention also does not use outside roller bearings on each end of the roller shaft, unlike the prior art, which further extends the life of the motor shaft.

In addition, a relatively small amount of space is preferably provided between rollers 66 and 68 and outlet 36. This allows smaller length tickets, such as shown in FIG. 3, to be dispensed more effectively. The smaller space, such as ¾ to ½ inch, between the roller and outlet allows a smaller ticket to be dispensed through outlet 36 while the ticket immediately adjacent to the dispensed ticket can be held by rollers 66 and 68. In addition, smaller tickets become jammed less often after moving through rollers 66 and 68 when a small space is provided.

After ticket strip 20 moves through drive mechanism 64, it is routed though outlet 36 in front panel 28 and to a player. The player receives the tickets 20 at a dispensing side 70 of outlet 36. The ticket path through the dispenser 34 is at a supply side 72 of outlet 36. An appropriate number of tickets is provided to the player based on game score or other determining factors in the game.

The drag created on the movement of ticket strip 20 by tension spring 58 against rear guide 54, by front guide 62, and by drive roller 66 is also important to the function of the ticket dispenser of the present invention. A player should not be allowed to receive more tickets than the dispensed amount of tickets by pulling more tickets through outlet 36 from the dispensing side 70. Traditionally, such pulling of ticket strip 20 has been prevented by tightening the tension between two rollers with a wedge slide or similar type of mechanism, where the greater the force the player pulls with, the greater is the tension between the rollers to prevent any tickets from being pulled out. However, the present invention wraps ticket strip 20 around guides 54 and 62 and around a large portion (about 50% or more) of the circumference of drive roller 66. The ticket strip 20 is also tensioned by tension spring 58. Thus, enough drag is provided to prevent a player from pulling the tickets through outlet 36, and a wedge slide or other tensioning or pinching mechanism is therefore not necessary to prevent a player from pulling out tickets. The tension on ticket strip 20 and drive roller 66 from pinch roller 68 can therefore be very much less than if the pinch roller were used to prevent the tickets from being pulled. Less tension on the drive roller prevents components from wearing out too quickly, as explained below.

The drag on ticket strip 20 can be adjusted by moving or replacing spring 58. The drag should be adjusted to allow drive roller 66 to have enough grip on ticket strip 20 to pull the strip 20 and to prevent the ticket strip from being pulled along ticket path 52 from dispensing side 76 without breaking the ticket strip 20.

FIG. 7 is a perspective view of a preferred embodiment 80 of ticket dispenser 34 shown in FIG. 6. Ticket dispenser 80 includes a base 82 and a bracket 84. Bracket 84 is used to fasten the ticket dispenser to the interior surface 35 of the front panel 28. Dispenser 80 also includes a base extension 86 which is coupled to base 82 and extends toward the rear of dispenser 80. Alternatively, base 82 can be made large enough to provide the additional surface area provided by base extension 86. Rear guide 54 is a cylindrical post which is coupled to base extension 86 and extends perpendicularly from the surface of the base extension. Rear guide 54 includes two guide nuts 88 which are spaced apart approximately the width W of ticket strip 20. The guide nuts can preferably be adjusted along rear guide 54 to accommodate different widths of tickets.

A circuit board 92 is preferably coupled to base extension 86 by a post 94. Circuit board 92 provides a base for sensor 60, which is aligned with rear guide 54 to allow ticket strip 20 to pass through sensor 60 (as shown more clearly with respect to FIG. 8). In addition, control circuitry 96 can be coupled to circuit board 92. Control circuitry 96 can include transistors and other electronic components well-known to those skilled in the art for reading signals from sensor 60 and providing a sensor signal on bus **44*a* to the main control circuitry 42 for the game apparatus 26. Bus 44*a* is part of main bus 44 as shown in FIG. 5. Alternatively, control circuitry 96 can include the portion of main circuitry 42 used to control the sensor 60 and drive mechanism 64 of ticket dispenser 34**.

Tension spring 58 includes a leaf spring member that is coupled to a spring support member 98. Member 98 is, in turn, coupled to base extension 86 and grounds spring 58.

Base 82 includes front guide 62, which is preferably a cylindrical post similar to rear guide 54 that includes two guide nuts 100 spaced apart at about the width W of ticket strip 20. Ticket strip 20 wraps around at least a quarter of the circumference of the front guide 62 to provide tension and friction to the movement of the ticket strip, as described above with reference to FIG. 6.

Drive roller 66 is a cylindrical member coupled to base 82 and extends perpendicularly from the surface of base 82. The roller is preferably made of rigid metal, but can also be made of other hard materials such as plastic.

A detailed view of drive roller 66 is shown in FIG. 7*a*. Drive roller 66 includes an outer surface having knobs 103 or similar projections to create a knurled surface on roller 66. The knurled surface allows drive roller 66 to grip tickets strip 20 and thus pull the strip more effectively. Other textures can also be used to provide a gripping surface.

Drive roller 66 also includes a central shaft 102 which couples the drive roller to a driver such as a motor (described below). Central shaft extends down into base 82 and is coupled to a motor shaft within base 82. Finally, drive roller 66 includes a wire guide 104 that is preferably positioned about midway down the length of roller 66. Wire guide 104 is preferably positioned in a recess 106 within the drive roller. Wire guide 104 functions to guide ticket strip 20 towards outlet 36 and also to prevent ticket strip 20 from sticking to the knurled surface of drive roller 66, as explained below.

Referring back to FIG. 7, pinch roller 68 is coupled to a pivoting member 108 approximately at a midpoint of the pivoting member. Pivoting member 108 is coupled to a hinge 110 (shown in FIG. 8) at one end, and the hinge 110 is coupled to base 82. The opposite end of pivoting member 108 is coupled to a spring 112. Spring 112 is, in turn, coupled to the top surface of base 82.

Pivoting member 108 causes pinch roller 68 to be forced against drive roller 66. This causes ticket strip 20, which is routed between roller 66 and roller 68, to be forced against drive roller 66 and allows the drive roller to grip ticket strip 20 routed between the two rollers. Spring 112 pulls one end of pivoting member 108 in the direction of arrow 114, which causes the pinch roller 68 to move against drive roller 66. Only a relatively small amount of tension between the rollers 66 and 68 is required to allow the drive roller to grip ticket strip 20 sufficiently to pull the tickets. The small amount of tension has the added benefit of providing less resistance for motor 118 to rotate drive roller 66, as described below. With less resistance, the bearings of motor 118 will not wear out as quickly. Pivoting member 108 can be moved in the direction opposite to the direction indicated by arrow 114 to move pinch roller 68 away from drive roller 66, as described with respect to FIG. 11.

Guide wall 116 is coupled to base 82 and is positioned near wire guide 104 to further guide ticket strip 20 toward outlet 36. Motor 118 is also coupled to base 82 and includes a shaft which extends down into base 82 to connect with shaft 102 of driver roller 66. Motor 118 can thus rotate drive roller 66 by rotating its own shaft, as shown in greater detail with reference to FIG. 12. Motor 118 also includes a control bus 44*b* which is part of main bus 44 as shown in FIG. 5. Main control system 42 can provide signals to motor 118 to activate or deactivate the motor.

The ticket dispenser 80 of the present invention is also open-sided, i.e. one side of the dispenser is always exposed and all points of the ticket path of ticket strip 20 through the dispenser can easily be seen and accessed. Since outside roller bearings are not used on rollers 66 and 68, one side of the dispenser can be exposed. This allows an operator to easily determine where a problem exists in the dispenser and to access the components of the dispenser for servicing. For example, ticket jams and other minor failures can quickly be fixed with the open-sided design.

Figure 8:
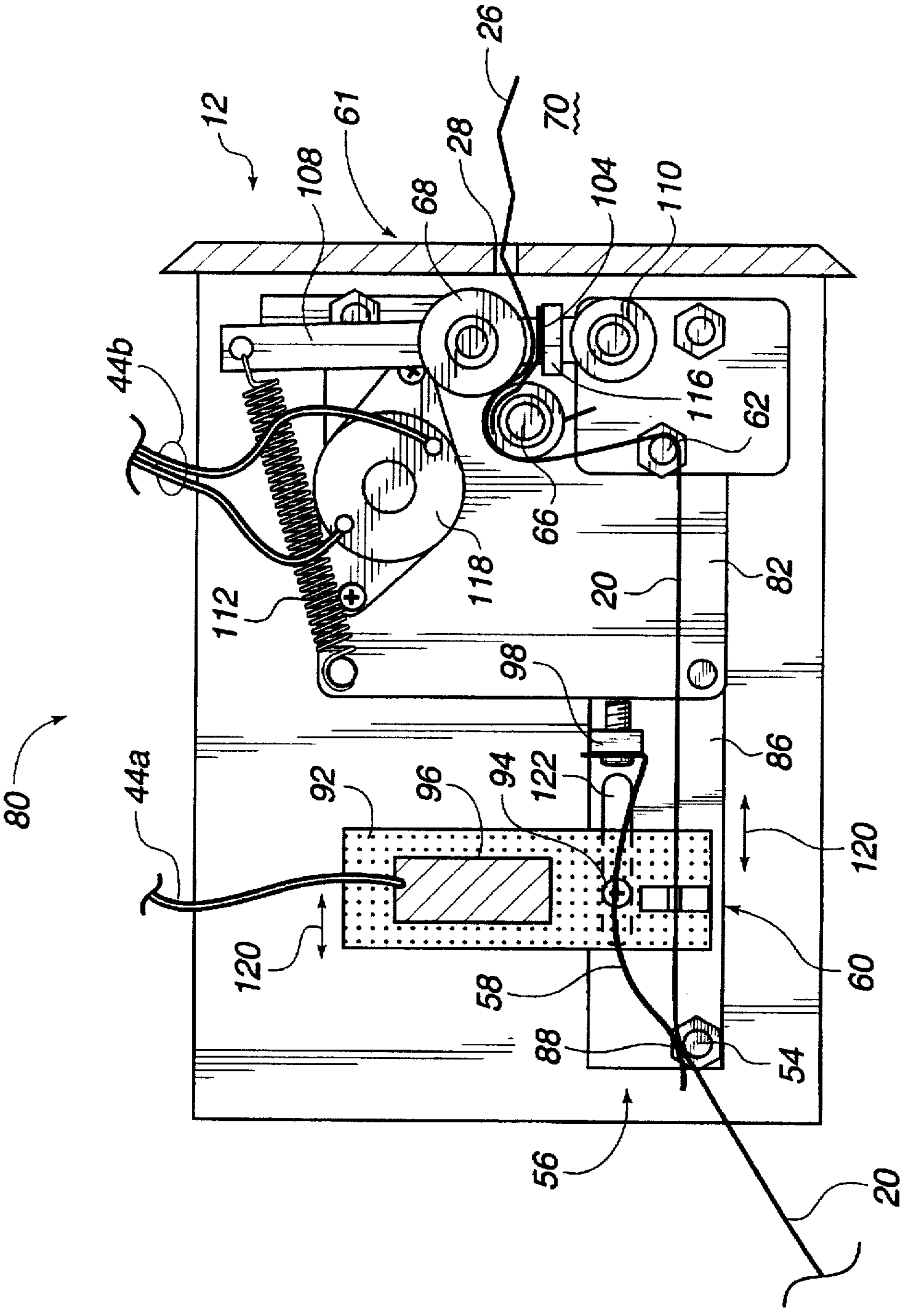
FIG. 8 is a side elevational view of the ticket dispenser of FIG. 7.

FIG. 8 is an elevational side view of the ticket dispenser 80 of FIG. 7. Ticket strip 20 is routed between tension spring 58 and rear guide 54 and through sensor 60. Sensor 60 is preferably an electromagnetic emitter/detector which senses when an electromagnetic beam is blocked. Sensor 60 is described in greater detail with respect to FIG. 9.

The position of sensor 60 and circuit board 92 can preferably be adjusted as shown by arrow 120. Post 94 can preferably be moved in the directions of arrow 120 within a slot 122 provided within base extension 86. Sensor 60 and board 92 are moved in the same direction as post 94. Sensor 60 can thus be moved to adjust the length of a ticket that extends out of outlet 36 when no tickets are being dispensed (described below).

Ticket strip 20 continues past sensor 60 and is wrapped around front guide 62. The ticket strip 20 is then wrapped around the knurled surface of drive roller 66. The ticket strip 20 does not touch wire guide 104 since the wire guide is within recess 106 in drive roller 66. Ticket strip 20 is most strongly pressed against the knurled surface of drive roller 66 at the point where pinch roller 68 is pressed against the drive roller from the force created by spring 112. Motor 118 drives drive roller 66 to pull ticket strip 20 from supply 37. Ticket strip 20 is guided by the other end of wire guide 104 and by guide wall 116 toward outlet 36 in front panel 28. A player receives and tears off the dispensed tickets from dispensing side 70 of the outlet 36. Without wire guide 104, ticket strip 20 might stick to the surface of drive roller 66 and continue to wrap around the drive roller as the driver roller rotates, causing a ticket jam.

Figure 9:
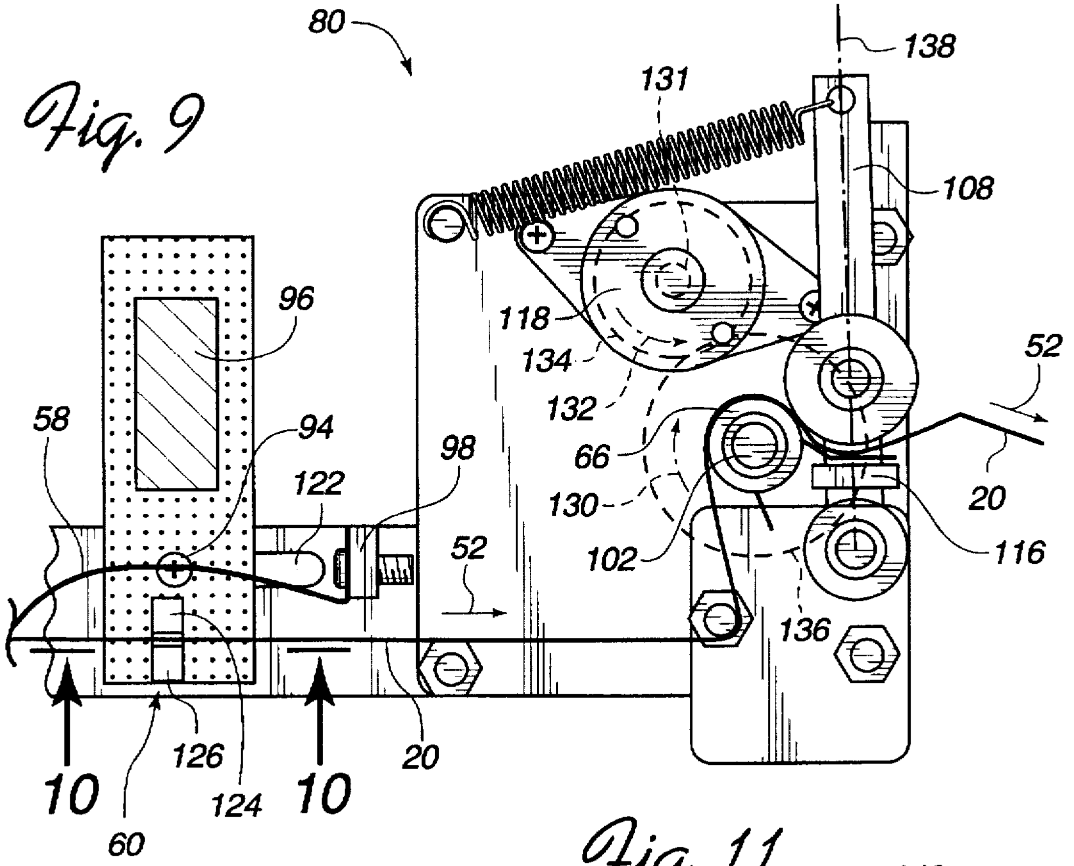
FIG. 9 is a detail view of the ticket dispenser as shown in FIG. 8.

FIG. 9 is a detailed side view showing a portion of ticket dispenser 80 of FIG. 8. Arrows 52 show the ticket path of ticket strip 20 as it moves through dispenser 80. Sensor 60 is shown having an emitter 124 and a detector 120. Emitter 124 preferably emits a beam of electromagnetic energy, such as infrared light, toward detector 120. Detector 120 provides an electrical signal to circuitry 96 (or main circuitry 42) when the emitted beam is detected.

Figure 10:
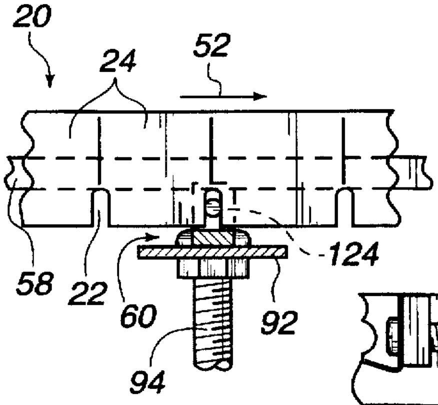
FIG. 10 is a top view along line 10—10 of FIG. 9 showing the sensor and ticket strip for the ticket dispenser.

FIG. 10 is a side cross sectional view of the sensor 60 and ticket strip 20 taken along line 10—10 of FIG. 9. The tickets of ticket strip 20 preferably include notch 22 at the division of each ticket 24 of the ticket strip. As ticket strip 20 passes through sensor 60, the beam from emitter 124 is either blocked when a notch is not in front of the emitter, or the beam is not blocked and allowed to be detected by detector 120 when a notch is in front of the detector (as shown in FIG. 10). The sensor 60 is able to count each notch 22, and therefore each ticket 24, as the ticket strip 20 moves through the sensor. Control circuitry can provide a signal from sensor 60 to main control circuitry 42, which can count tickets and determine when to activate and deactivate motor 118. In alternate embodiments, holes or notches in different locations can be positioned in ticket strip 20 so that sensor 60 can detect each ticket, as is well known to those skilled in the art.

Referring back to FIG. 9, since the sensor 60 is used to count tickets, the position of sensor 60 can determine how much of the length of a ticket is protruding from outlet 36 when motor 118 is deactivated. Sensor 60 can be moved by moving post 94 within slot 122 so that a notch will be detected a certain distance from outlet 36 along ticket path 52. When a notch is detected and motor 118 deactivated, a certain length of ticket will be protruding from outlet 36; this length is preferably adjusted, if necessary, to be about ½ of the length of an individual ticket.

FIG. 9 also shows drive roller 66 is operative to rotate in a direction indicated by arrow 130. Motor 118 rotates a motor shaft 131 in a direction indicated by arrow 132. One method of transmitting the motion of motor shaft 131 to shaft 102 is to use a gear assembly. For example, motor gear 134 is positioned within base 82 and is coupled to motor shaft 131. Motor gear 134 is also positioned within base 82 and is interlocked with roller gear 136, which is coupled to drive roller shaft 102. When motor gear 134 is rotated by motor 118, roller gear 136 is also rotated, which in turn rotates drive roller 66 in direction 130. Other well-known methods and apparatuses can also be used to rotate drive roller 66 with motor 118.

FIG. 11 is a side elevational view showing pinch roller 68 of dispenser 80 being moved. The position of pinch roller 68 when in a dispensing position is shown by dashed line 138, where the pinch roller is biased against the surface of drive roller 66 due to force exerted on pivoting member 108 by spring 112. An operator may rotate pivoting member 108 about axis A in a direction indicated by arrow 142 to a position indicated by line 140. The operator can thus access ticket strip 20 positioned between drive roller 66 and pinch roller 68 and easily remove tickets to fix a ticket jam or tangle in the dispenser mechanism or to service components in ticket dispenser 80. This configuration is also advantageous in that only a relatively small amount of tension is provided by spring 112 to force pinch roller 68 against drive roller 66, so that a jammed ticket strip may itself force pinch roller to position 140 and at least partially release the tickets to prevent a severe ticket jam.

Figure 12:
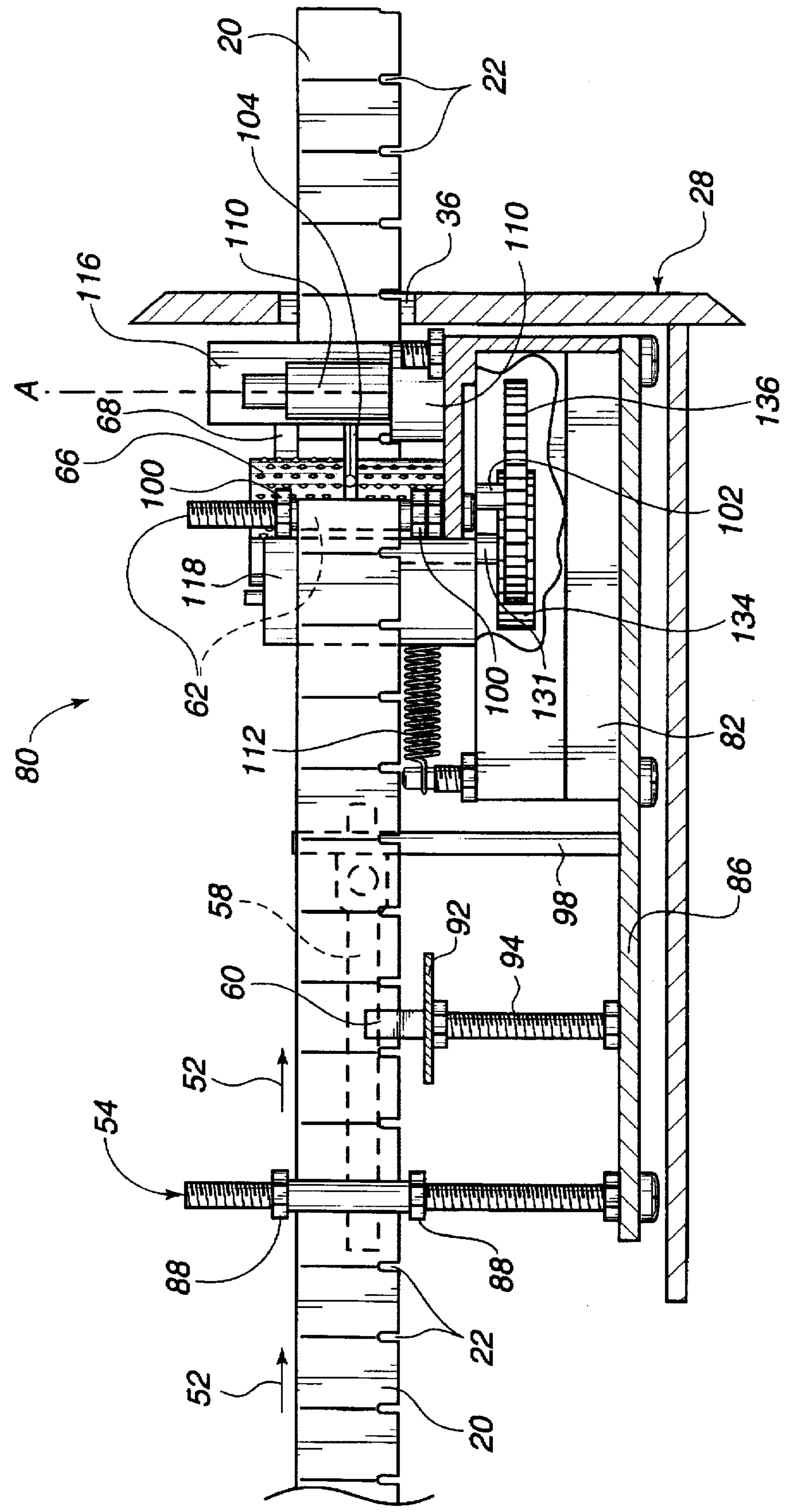
FIG. 12 is top view of the ticket dispenser of FIG. 7.

FIG. 12 is a top view of ticket dispenser 80 as shown in FIG. 7. A ticket strip 20 including notches 22 is shown routed through the dispenser. Rear guide 54 aligns ticket strip 20 at a position between guide nuts 88, and front guide 62 aligns the strip along the same position between guide nuts 100. Hinge 110 allows pivoting member 108 to pivot about axis A.

A cutaway view of base 82 shows motor shaft 131 extend down to motor gear 134. Gear 134 is interlocked with roller gear 136, which is coupled to drive roller shaft 102 that is coupled to drive roller 66.

Figure 13:
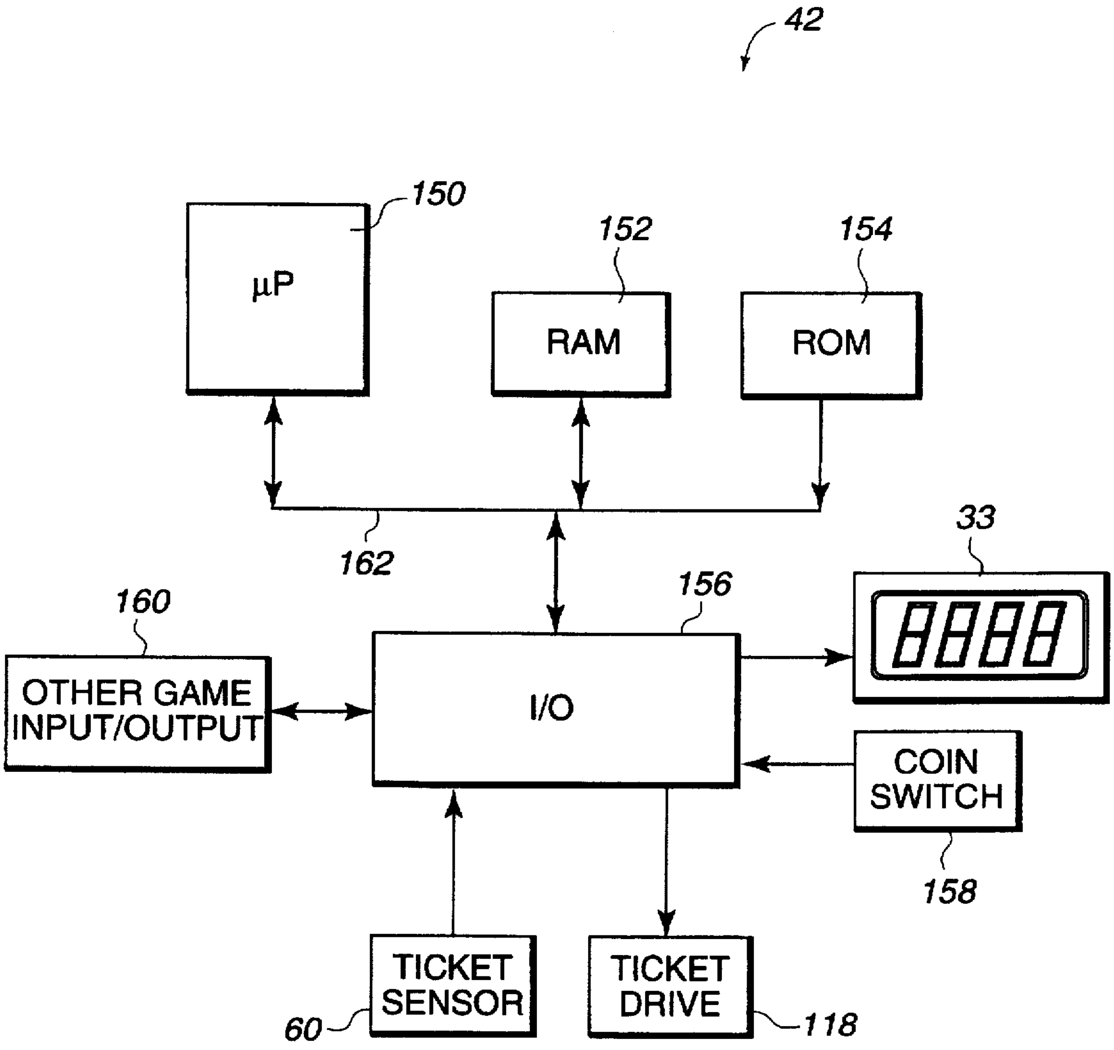
FIG. 13 is a block diagram of a control system for a game apparatus and ticket dispenser of the present invention.

FIG. 13 is a block diagram of main control system 42 of game apparatus 26 that is suitable for controlling the ticket dispenser 34 or 80 of the present invention. The control system, for example, can be implemented on one or more printed circuit boards which can be located in the interior of game apparatus 26, for example, as shown in FIG. 5. The components of control system 42 include a microprocessor 150, random access memory (RAM) 152, read-only memory (ROM) 154, game score display 33, I/O circuitry 156, coin switch 158, ticket sensor 60, ticket drive 118, and other game input/output components 160.

Microprocessor 150 controls the operation of game apparatus 26 and ticket dispenser 34. A wide variety of microprocessors can be used, including 8-bit microprocessors to more complex types as is well known to those skilled in the art. Microprocessor 150 is coupled to ROM 154 by a data/address/control bus 162. The ROM 154 can be an erasable, programmable read-only memory (EPROM) that contains the start-up instructions and operating system for the microprocessor 150. Microprocessor 152 is connected to RAM 152 by bus 162 to permit the use of RAM for scratch-pad memory and other functions. Methods for coupling ROM 154 and RAM 152 to the microprocessor 150 by bus 120 including enable, address, and control lines are well-known to those skilled in the art.

The microprocessor 154 is also coupled to I/O circuitry 156 which can include such components as drivers, buffers, latches, etc. I/O circuitry 156 receives data from several components, including ticket sensor 60, coin slot switch 158, and other game input components 160. Ticket sensor 60 provides a detection signal for each notch 22 of ticket strip 20 that passes through the sensor. Microprocessor can count the number of sensed notches to determine how many tickets have been dispensed. Coin slot switch 158 detects when a coin has been inserted into coin slot 29 of the game apparatus 26. Other game input components can be any other sensors, switches or the like used in the game apparatus.

I/O circuitry 156 also provides signals from microprocessor 150 to drive output devices including ticket drive motor 118 for rotating drive roller 66 to dispense tickets from the dispenser. Game score display 33 is also controlled by microprocessor 150 through I/O circuitry to display the current score as kept track by microprocessor 150. Other game output components can also be controlled, such as motors, solenoids, lights, speakers, or the like used in game apparatus 26.

The preferred embodiment of the control system 42 operates briefly as follows. The microprocessor 150 sequences through the software instructions stored in ROM 154 and sends and receives data over the bus 120 in order to conduct a game. For example, when the coin slot switch 158 is activated, indicating a coin has been inserted into coin slot 29, the microprocessor receives a signal from the I/O circuitry on bus 120 and starts a game. Once the game is over, the microprocessor activates dispenser motor 118 to dispense a number of tickets based on the game score or other game result. The microprocessor 150 receives signals from ticket sensor 60 indicating when a notch 22 passes through the sensor. The microprocessor then deactivates motor 118 when the correct number of notches have been sensed. Alternatively, tickets can be dispensed during game play instead of or in addition to dispensing tickets when the game is over.

While this invention has been described in terms of several embodiments, it is contemplated that alterations, modifications and permutations thereof will become apparent to those skilled in the art upon a reading of the specification and study of the drawings. For example, the tickets described herein can be used for a variety of applications in which a number of tickets are dispensed to users who can exchange the tickets for goods or services. The dispenser of the present invention can likewise be provided to dispense the tickets of the present invention, or other types of tickets, for a wide variety of applications.

It is therefore intended that the following claims include all such alterations, modifications and permutations as fall within the spirit and scope of the present invention.

What is claimed is:

1. A ticket dispenser for dispensing thin redemption tickets from a game apparatus, the ticket dispenser comprising:

an outlet positioned at a front of said ticket dispenser, said outlet having a dispenser side, wherein tickets included in said strip of tickets are dispensed from said game apparatus through said outlet to said dispensing side;

a rear guide shaft positioned near a rear of said ticket dispenser for engaging a continuous strip of tickets and guiding said strip of tickets along a ticket path from a supply of tickets, said rear guide shaft for developing a substantial drag on said strip of tickets as said strip of tickets moves along said ticket path, wherein said drag on said strip of tickets resists pulling of said strip through said outlet by a person at said dispensing side of said outlet; and driver means positioned near a front of said ticket dispenser, upstream from said rear guide shaft, engaging said strip of tickets and pulling said strip along said ticket path from said supply of tickets towards said front of said ticket dispenser, said tickets contacting a portion of said driver means to contribute to said drag which resists pulling of said strip through said outlet by a person at said dispensing side of said outlet, wherein said driver means includes a driver roller and a pinch roller.

2. A ticket dispenser as recited in claim 1 wherein said ticket dispenser is operative to dispense a strip of tickets having a paper weight of 20 lb. paper stock or less.

3. A ticket dispenser as recited in claim 2 wherein said ticket dispenser is operative to dispense a strip of tickets, wherein one of said tickets of said strip has a length less than or equal to ¾ inch.

4. A ticket dispenser as recited in claim 1 wherein said ticket dispenser includes a tension spring biased against said rear guide shaft for providing said drag to the movement of said strip of tickets, wherein a tension of said spring and thus the drag applied to said strip of tickets is adjustable.

5. A ticket dispenser as recited in claim 4 wherein one side of said ticket dispenser is open to allow all points along said ticket path to be accessed by an operator of said ticket dispenser.

6. A ticket dispenser as recited in claim 4 further comprising a controller coupled to said driver roller and to said sensor for activating said drive roller to dispense a desired number of tickets from said outlet and sensing the amount of dispensed tickets from said sensor.

7. A ticket dispenser as recited in claim 1 further comprising a sensor positioned at a point on said ticket path for detecting a number of tickets that have been dispensed through said outlet.

8. A ticket dispenser as recited in claim 7 wherein said sensor can be moved along said ticket path to adjust a length between where said sensor detects a ticket and said outlet, thereby adjusting a length of a ticket extending from said outlet.

9. A ticket dispenser as recited in claim 1 wherein said driver means includes a driver roller for engaging said strip of tickets and pulling said strip.

10. A ticket dispenser as recited in claim 9 wherein said drive roller includes a knurled surface to grip said strip of tickets and to provide said drag to said strip of tickets to resist pulling of said tickets from said outlet by said person.

11. A ticket dispenser as recited in claim 9 wherein said drive roller is positioned on said ticket dispenser such that strip of tickets wraps around at least one quarter of the circumference of said drive roller to provide said drag to said strip of tickets when said strip is pulled from said outlet by said person.

12. A ticket dispenser as recited in claim 11 wherein said drive roller includes a guide wire positioned at least partially about said circumference of said driver roller and extending away from said drive roller toward said outlet for guiding said strip toward said outlet and preventing said strip of tickets from sticking to said drive roller.

13. A ticket dispenser as recited in claim 11 further comprising a pinch roller coupled to said ticket dispenser and operative to hold said strip of tickets against said drive roller, said pinch roller providing a minimum amount of tension on said strip of tickets to pull said strip of tickets along said ticket path.

14. A ticket dispenser as recited in claim 13 wherein said pinch roller is coupled to a spring member that forces said pinch roller against said drive roller.

15. A ticket dispenser as recited in claim 9 further comprising cylindrical front guide means coupled to said ticket dispenser and positioned further from said front than said drive roller on said ticket path to align said strip of tickets for said drive roller, wherein said front guide means is positioned such that said strip of tickets wraps partially around the circumference of said front guide means to substantially add to said drag and resist said pulling of said tickets from said outlet by said person.

16. A ticket dispenser as recited in claim 15 wherein said front guide means is positioned such that said strip of tickets is wrapped around at least one-quarter of the circumference of said front guide means to provide an amount of drag to the movement of said strip of tickets along said ticket path.

17. A method for dispersing thin redemption tickets from a ticket dispenser, the method comprising:

providing a strip of thin tickets from a ticket supply;

routing said strip of tickets in a ticket path through said dispenser, through a rear guide, around a portion of the circumference of a cylindrical front guide, through a roller pair including a pinch roller and a drive roller, to an outlet in said ticket dispenser, said outlet having a supply side and a dispensing side;

pulling with said roller pair a desired number of tickets in said strip of tickets along said ticket path through said ticket dispenser from said ticket supply to said outlet in said ticket dispenser, wherein said desired number of tickets is dispensed to a recipient of said tickets; and guiding said strip of tickets as said strip of tickets is pulled by said ticket dispenser using said rear guide and said front guide, and collectively exerting a substantial drag opposing the movement of said strip of tickets with said rear guide and said front guide to prevent said strip of tickets from being pulled from the dispensing side of said outlet by said recipient.

18. A method as recited in claim 17 wherein said drive roller is coupled to said ticket dispenser and engages said strip of tickets closer to said outlet than said rear guide to pull said strip.

19. A method as recited in claim 18 wherein said pulling a desired number of tickets includes counting said desired number of tickets using a sensor.

20. A method as recited in claim 19 wherein said strip of tickets has a paper weight of 20 lbs. or less.

21. A method as recited in claim 18 wherein said pinch roller forces said strip of tickets against said drive roller with a minimal amount of tension to allow said drive roller to pull said strip.

22. A method as recited in claim 21 wherein said guiding said strip of tickets further comprises guiding said strip using a wire guide wrapped around at least quarter of the circumference of said drive roller, said wire guide extending away from said drive roller in a direction toward said outlet and preventing said strip from sticking to said drive roller.

23. A method as recited in claim 17 wherein said rear guide includes a tension spring for providing at least a portion of said amount of drag to said movement of said strip of tickets.

24. A method as recited in claim 23 wherein said tickets are routed around at least one-quarter the circumference of said front guide to provide at least a portion of said amount of drag.

25. A method as recited in claim 17 wherein said tension spring provides a drag on said strip of tickets that is adjustable by adjusting a tension of said tension spring.

26. A ticket dispenser for dispensing thin redemption tickets from a game apparatus, the ticket dispenser comprising:

a base;

a drive roller coupled to said base for engaging a continuous strip of thin tickets and pulling said strip along a ticket path from a supply of tickets towards a front of said ticket dispenser, wherein said strip of tickets wraps around at least one-quarter of the circumference of said drive roller to provide drag to said strip of tickets when said strip is pulled from said outlet by a person;

a pinch roller coupled to said base and operative to hold said ticket strip against said drive roller with a pinch tension allowing said drive roller to pull said ticket strip along said ticket path;

a cylindrical front guide coupled to said base at a location before said drive roller on said ticket path for engaging and guiding said strip of tickets along said ticket path and adding to said drag to said strip of tickets when said strip is pulled from a dispensing side of said outlet by a person;

a rear guide shaft coupled to said base at a location on said ticket path further from said drive roller than said cylindrical front guide, said rear guide shaft engaging and guiding said strip of tickets along said ticket path and substanitally adding to said drag on said strip of tickets when said strip is pulled from a dispensing side of said outlet by said person; and an outlet positioned at said front of said ticket dispenser, wherein said strip of tickets is dispensed from said game apparatus through said outlet and wherein said drag on said ticket strip contributed by said drive roller said cylindrical front guide, and said rear guide shaft prevent said strip of tickets to be pulled through said dispenser from said outlet by said person.

27. A ticket dispenser as recited in claim 26 wherein said rear guide shaft includes a tension spring that develops a portion of said drag on said strip of tickets as said strip of tickets moves along said ticket path, and wherein said drive roller pulls said strip of tickets against said drag.

28. A ticket dispenser as recited in claim 27 wherein said strip of tickets has a paper weight of 20 lb. paper stock or less.

29. A ticket dispenser as recited in claim 26 wherein said drive roller includes a guide wire positioned at least partially about said circumference of said driver roller and extending away from said drive roller in a direction towards said outlet for guiding said strip of tickets toward said outlet and preventing said strip of tickets from sticking to said drive roller.

30. A ticket dispenser as recited in claim 26 wherein said cylindrical front guide is positioned in said ticket dispenser such that said strip of tickets is wrapped around a portion of a circumference of said front guide.

* * * * *